US006735017B1

(12) United States Patent
Acosta et al.

(10) Patent No.: US 6,735,017 B1
(45) Date of Patent: May 11, 2004

(54) BROADBAND OPTICAL RETARDATION DEVICE

(75) Inventors: Elizabeth Jane Acosta, Botley (GB); Emma Jayne Beynon, Cowley (GB); Adrian Marc Simon Jacobs, Littlemore (GB); Michael Geraint Robinson, Boulder, CO (US); Kirstin Ann Saynor, Anglesey (GB); Martin David Tillin, Abingdon (GB); Michael John Towler, Botley (GB); Harry Garth Walton, Cowley (GB)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/555,187

(22) PCT Filed: Nov. 25, 1998

(86) PCT No.: PCT/JP98/05302

§ 371 (c)(1),
(2), (4) Date: Sep. 1, 2000

(87) PCT Pub. No.: WO99/27398

PCT Pub. Date: Jun. 3, 1999

(30) Foreign Application Priority Data

Nov. 26, 1997 (GB) ............................................. 9725097

(51) Int. Cl.[7] .............................................. G02B 27/28
(52) U.S. Cl. ........................ 359/497; 349/117; 359/501
(58) Field of Search .................... 359/483, 73, 485, 359/497, 494, 296, 501; 349/19, 117

(56) References Cited

U.S. PATENT DOCUMENTS 5,548,427 A * 8/1996 May .............................. 349/117
6,100,944 A * 8/2000 Sharp et al. .................... 349/19

FOREIGN PATENT DOCUMENTS

| EP | 0656560 | 6/1995 |
| EP | 0689065 | 12/1995 |
| EP | 0887666 | 12/1998 |
| WO | 9500872 | 1/1995 |

OTHER PUBLICATIONS

Schadt et al.; "Photo–Generation of Linearly Polymerized Liquid Crystal Aligning Layers Comprising Novel, Integrated Optically Patterned Retarders and Color Filters"; *Jp. J. Appl. Phys.*; vol. 31, pp. 3240–3249; 1995.

* cited by examiner

Primary Examiner—Audrey Chang
Assistant Examiner—Craig Curtis
(74) Attorney, Agent, or Firm—Renner, Otto, Boisselle & Sklar (57) ABSTRACT

A broadband optical retardation device, such as may be used for polarisation encoding of display information or in diffractive optical systems, includes a patterned uniform half wave plate retarder in combination with a non-patterned uniform quarter wave plate retarder having an optic axis oriented at 90° to the xz plane. The patterned retarder consists of alternating first and second regions having first and second optic axes at different orientations to a reference axis, for example at +22.5° and −22.5° to the xz plane. Considering light of wavelength $\lambda°$ incident on the retarder and linearly polarised in the xy plane, such light is differently polarised by the regions, and the light output by the device includes regions in which the light is right circularly polarised and regions in which the light is left circularly polarised. In the case of incident light of wavelengths greater or less than $\lambda°$, the output light becomes progressively more linearly polarised as the wavelengths departs to a greater extent from the ideal value, but not to the same extent as would be the case if the device consisted simply of a patterned single layer acting as a quarter plate retarder.

28 Claims, 12 Drawing Sheets

| WAVELENGTH | ELLIPTICITY FOR SINGLE QUARTER WAVE PLATE (a) | ELLIPTICITY FOR SERIES HALF WAVE/QUARTER WAVE PLATES (b) |
|---|---|---|
| 400 | -0.46 | -0.62 |
| 430 | -0.56 | -0.72 |
| 460 | -0.66 | -0.81 |
| 490 | -0.75 | -0.87 |
| 520 | -0.83 | -0.92 |
| 550 | -0.92 | -0.96 |
| 580 | -1.0 | -1.0 |
| 610 | -0.93 | -0.97 |
| 640 | -0.86 | -0.94 |
| 670 | -0.81 | -0.91 |
| 700 | -0.76 | -0.88 |
| 730 | -0.72 | -0.85 |

| WAVELENGTH | ELLIPTICITY FOR SERIES TWISTED UNIFORM WAVE PLATE COMBINATION |
|---|---|
| 400 | -0.76 |
| 430 | -0.86 |
| 460 | -0.93 |
| 490 | -0.96 |
| 520 | -0.92 |
| 550 | -0.89 |
| 580 | -0.96 |
| 610 | -0.91 |
| 640 | -0.93 |
| 670 | -0.89 |
| 700 | -0.91 |
| 730 | -0.85 |

BROADBAND OPTICAL RETARDATION DEVICE

TECHNICAL FIELD

This invention relates to broadband optical retardation devices, and is concerned more particularly with the use in such devices of patterned optical retarders in which the optic axis varies over the retarder in accordance with a predefined pattern.

BACKGROUND ART

By a "broadband optical retardation device" is meant a retardation device for light consisting of a broad range (of the order of tens or hundreds of nanometers) of wavelengths which constitutes at least a part of the complete wavelength range of visible light and ultraviolet and infrared radiation.

Such optical retardation devices may be used for polarisation encoding of display information or in diffractive optical systems, for example.

S. Pancharatnam "Achromatic Combination of Birefringent Plates", Proceedings of Indian Academy of Sciences vol XLI, No 4, Sec A, 1955, pp 130–136 and pp 137–144, discuss the use of stacked uniform retarder films to improve achromaticity, that is the independence of its light transmission properties from the wavelength of the input light. Use is made of combinations of uniform retarder films having different azimuthal orientations of their optic axes. A method for calculating the required retardations and orientations of the optic axes is also given. However these references are concerned only with combinations of uniform retarders, that is retarders whose optic axis is substantially invariant over the retarder.

It is known to fabricate patterned retarders, that is retarders whose optic axis vary over the retarder, for example between first and second regions which alternate in x and/or y directions over the plane of a layer. European Published Patent Application No. 0689084 (Schadt) proposes the use of reactive mesogen layers as optical elements and alignment surfaces.

It is an object of the invention to provide an optical retardation device having improved achromaticity which is capable of generating broad band orthogonal optical modes.

DISCLOSURE OF INVENTION

According to the present invention there is provided a broadband optical retardation device for receiving light consisting of a broad range of wavelengths, the device including patterned optical retardation means including a first region having a first optic axis at an orientation a between 0° and +90° to a reference plane and a second region having a second optic axis at an orientation b between 0° and –90° to the reference plane, and non-patterned optical retardation means having an optic axis at a defined orientation c, greater than the orientation a and less than the orientation 180°+b, to the reference plane in order to increase the achromaticity of the light polarised by the combination of the patterned optical retardation means and the non-patterned optical retardation means as compared with the light polarised by the patterned optical retardation means alone.

It should be understood that, in the above definition and elsewhere in the specification, the term "optic axis" is used to denote the so-called slow optic axis of the material referred to.

Such a combination of patterned optical retardation means and non-patterned optical retardation means in this manner enables generation of broad band orthogonal optical modes in a straight forward manner, and permits a broad bandwidth response to be obtained with improvement in the quality and/or ease of fabrication as compared with known broad band optical retardation devices.

The first and second regions of the patterned optical retardation means are preferably such as to polarise input light linearly polarised along the reference plane such that, after passing through the non-patterned optical retardation means, the light which has passed through the first region is orthogonal to the light which has passed through the second region. It will be understood that the required orthogonal relationship between the polarised light from the first regions and the polarised light from the second regions can be satisfied whether the light is linearly polarised or circularly polarised.

In a preferred embodiment of the invention the orientations a and b of the first and second axes of the patterned optical retardation means are substantially equal and opposite relative to the reference plane, and the orientation c of the optic axis of the non-patterned optical retardation means is substantially perpendicular to the reference plane. Such an arrangement optimises the broad band response of the device.

The orientations a and b of the first and second axes of the patterned optical retardation means are preferably in the ranges of +10° to +75° and –10° to –75° respectively, and most preferably in the ranges of +10° to +35° and –10° to –35°, relative to the reference plane. The optimum response is obtained if the first and second orientations a and b of the first and second axis of the patterned optical retardation means are about +22.5° and –22.5° respectively relative to the reference plane.

In one embodiment of the invention the orientations a and b of the first and second optic axes of the patterned optical retardation means and the orientation c of the optic axis of the non-patterned optical retardation means substantially satisfy the relationships $c=a+45°$ and $b=c-45°$.

The patterned optical retardation means may include a patterned uniform layer having an optic axis which varies between the first and second regions along one or more directions x and y parallel to the layer, but which does not vary substantially through the thickness of the layer.

Alternatively the patterned optical retardation means may include a patterned twisted retardation layer having an optic axis which varies between the first and second regions along one or more directions x and y parallel to the layer and also through the thickness of the layer.

Furthermore the non-patterned optical retardation means may include a uniform retardation layer whose optic axis has an orientation which does not vary substantially through the thickness of the layer.

Alternatively the non-patterned optical retardation means may include a twisted retardation layer whose optic axis has an orientation which varies through the thickness of the layer.

The invention also provides an optical retardation device including patterned optical retardation means including a first region having a first optic axis configuration and a second region having a second optic axis configuration, and non-patterned optical retardation means having a further optic axis configuration, at least one of the optic axis configurations being a twisted optic axis configuration whose optic axis has an orientation which varies through the thickness of a layer, whereby the achromaticity of the light polarised by the combination of the patterned optical retardation means and the non-patterned optical retardation means is increased as compared with light polarised by the patterned optical retardation means alone.

In one embodiment of the invention the first optic axis configuration has an average optic axis orientation a between 0° and +90° to a reference plane, the second optic axis configuration has an average optic axis orientation b between 0° and −90° to the reference plane, and the further optic axis configuration has an average optic axis orientation c, greater than the orientation a and less than the orientation 180°+b, to the reference plane.

In an alternative embodiment of the invention the first optic axis configuration has an output director orientation a between 0° and +90° to a reference plane, the second optic axis configuration has an output director orientation b between 0° and −90° to the reference plane, and the further optic axis configuration has an output director orientation c, greater than the orientation a and less than the orientation 180°+b, to the reference plane.

In order that the invention may be fully understood, reference will now be made, by way of example, to the accompanying drawings in which.

BRIEF DESCRIPTION OF DRAWINGS

BEST MODE FOR CARRYING OUT THE INVENTION

Figure 1:
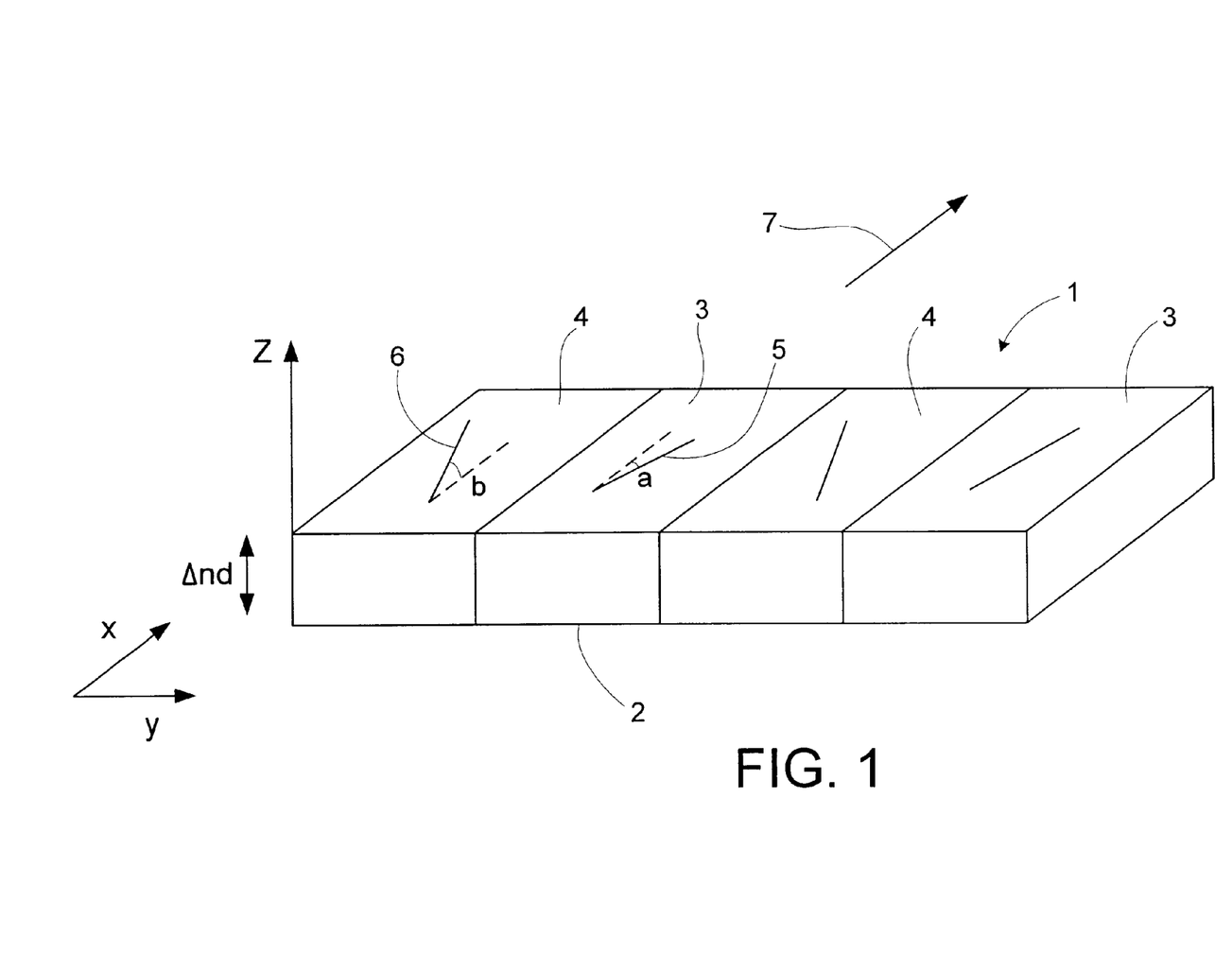
FIG. 1 is a schematic diagram of a patterned uniform retarder.

FIG. 1 schematically shows a patterned optical retarder 1 having a patterned layer 2 applied to a substrate (not shown) and consisting of alternating first and second regions 3 and 4 having first and second optic axes 5 and 6 at different orientations to a reference axis 7. More particularly the optic axis 5 is orientated at an orientation a between 0° and +90° to the reference axis 7, and the optic axis 6 is orientated at an orientation b between 0° and −90° to the reference axis 7, the angles a and b preferably being equal and opposite.

Whilst FIG. 1 shows the particular case of the patterned retarder 1 consisting of alternating squares, and second regions 3 and 4, for example alternating bands, having differently orientated optic axes, it should be appreciated that patterned retarders may also be used which consist of regions of more than two types, that is three or more regions having optic axes of different orientations arranged in regular sequences or irregularly. For example, three uniform half wave plates arranged at −22.5°, +22.5° and 0° to a reference axis may be followed by a uniform quarter wave plate arranged at 90° to the reference axis. Incident linear light polarised along the 0° direction can then be patterned into right circular, left circular and linear light. If two detectors (information channels) sensitive to right and left polarised light follow this patterned optical element, then the right and left circularly polarised information only passes down one channel, whereas the linearly polarised information is shared substantially equally between the two channels. The two detectors may, for example, be the left and right eye of a viewer of a stereoscopic panel, where the left eye is covered by one circular polariser and the right eye is covered by the orthogonal circular polariser. Information that is linearly encoded represents those parts of an image that could be viewed by both eyes. Information that is circularly encoded represents those parts of an image that could be viewed by one eye only.

Generally, if the layer 2 is considered as being positioned parallel to a plane (x, y) where x and y are orthogonal directions and the z-direction is normal to the plane of the layer 2, the unit vector which points along the local optic axis within the layer 2 may be termed the director n(x, y, z). In the case of an in-plane retarder $n_z$–0°. Furthermore in the case of a uniform retarder (whether patterned or not) $n_x$ and $n_y$ do not vary as a function of z, whereas in the case of a twisted retarder (whether patterned or not) $n_x$ and $n_y$ vary as function of z, that is $n_x=n_x(z)$ and $n_y=n_y(z)$. Where the retarder is patterned, so that the orientation of the optic axis varies across the layer, $n_x$ and $n_y$ vary as a function of x and/or y, that is $n_x=n_x(x, y)$ and $n_y=n_y(x, y)$, whilst not substantially varying as a function of z. However, in the case of a patterned twisted retarder, $n_x$ and $n_y$ vary as a function of z and well as a function of x and/or y, that is $n_x=n_x(x, y, z)$ and $n_y=n_y(x, y, z)$.

Thus, in the case of the patterned uniform retarder 1 shown in FIG. 1, the direction of the projection of the optic axis $n=(n_x, n_y, n_z)$ onto the plane (x, y) varies as a function of position $n=n(x, y)$ but the magnitude of the optical retardation does not vary as a function of position (x, y). In the particular case shown the layer 2 consists of two regions 3 and 4 of retardance $\Delta nd-\lambda_0/2$ where $\Delta n$ represents the change in refractive index across the layer, d represents the thickness of the layer and $\lambda_0$ represents the mean wavelength of incident light. The layer 2 therefore represents a half wave plate. Furthermore the optic axes 5 and 6 are preferably at +22.5° and −22.5° to the xz plane (a=+22.5°, b=−22.5°). Particular embodiments of the invention utilising such a patterned half wave plate retarder 1 will now be described, by way of example, with the reference to FIGS. 2A and 3, like reference numerals being used in those figures to denote similar parts.

Figure 2A:
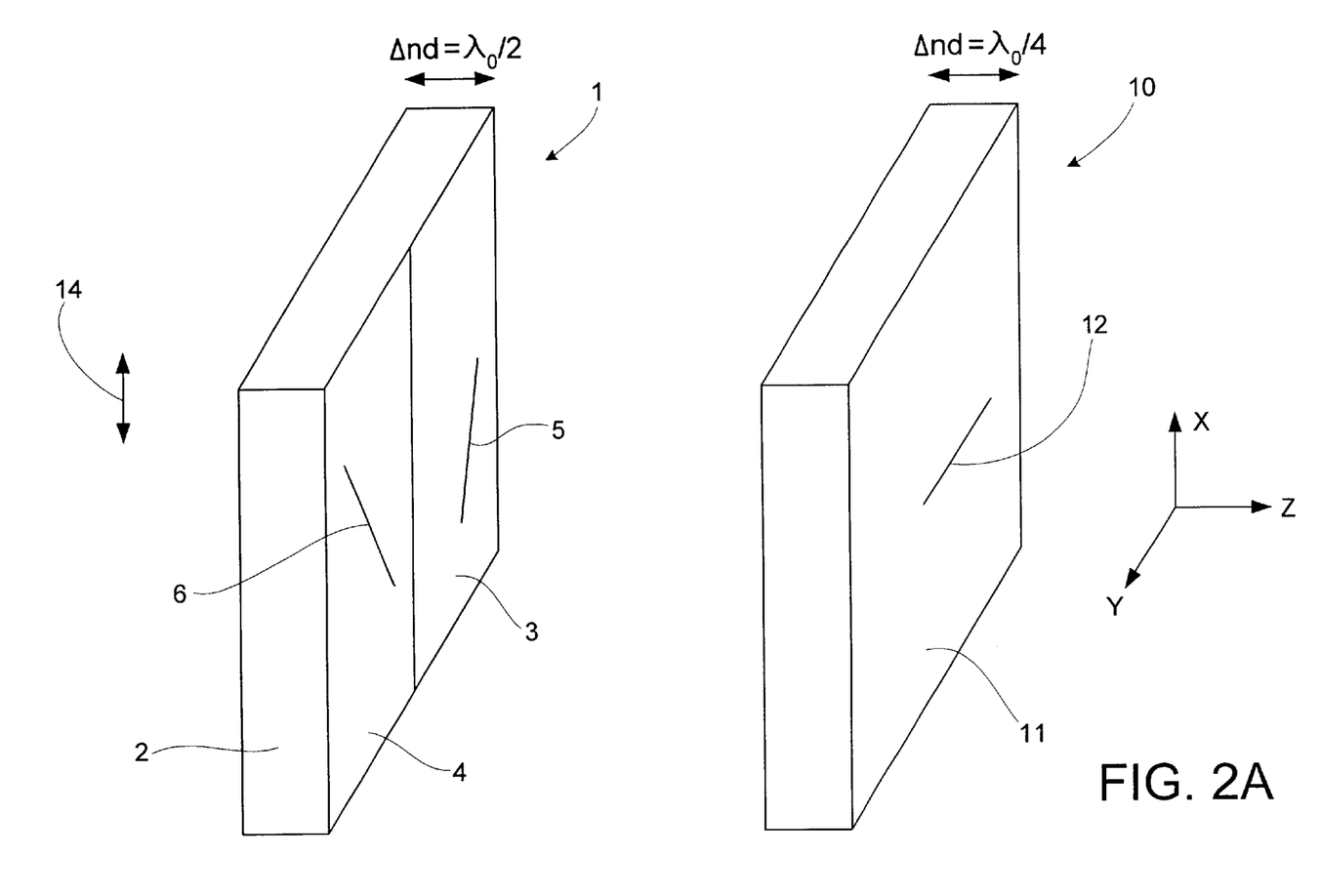
FIG. 2A is a schematic diagram of a broadband optical retardation device in accordance with the invention consisting of a combination of a patterned uniform half wave plate and a non-patterned uniform quarter wave plate.

FIG. 2A shows such a patterned uniform half wave plate retarder 1 in combination with a non-patterned uniform quarter wave plate retarder 10 formed by a layer 11 parallel to the layer 2 having a retardance $\Delta nd=\lambda_0/4$ and an optic axis 12 having an orientation at 90° to the xz plane, that is perpendicular to the average of the optic axes 5 and 6 of the two regions 3 and 4 of the patterned layer 2. In the case of the retarder 10 the orientation of the optic axis 12 is substantially unvarying over the layer 11.

Considering light of wavelength $\lambda_0$ which is incident on the layer 4 in the direction z and is linearly polarised in the xy plane as shown at 14, such light is differently polarised by the regions 3 and 4 of the layer having optic axis 5 and 6 at +22.5° and −22.5° to the xz plane, and the light output by the device includes regions in which the light is right circularly polarised and regions in which the light is left circularly polarised. In the case of incident light of wavelengths greater or less than $\lambda_0$ as the wavelength departs to a greater extent from the ideal value, the output light becomes progressively more linearly polarised, but not to the same extent as would be case if the device consisted simply of a patterned single layer acting as a quarter wave plate retarder. Thus the combination of the patterned uniform half wave plate retarder 1 and the non-patterned uniform quarter wave plate retarder 10 serves as a broad band patterned quarter wave plate retarder in which the polarisation of the two components of the output light is less sensitive to variations in the wavelength of the incident light than is the case with conventional patterned quarter wave plate retarders.

Figure 2B:
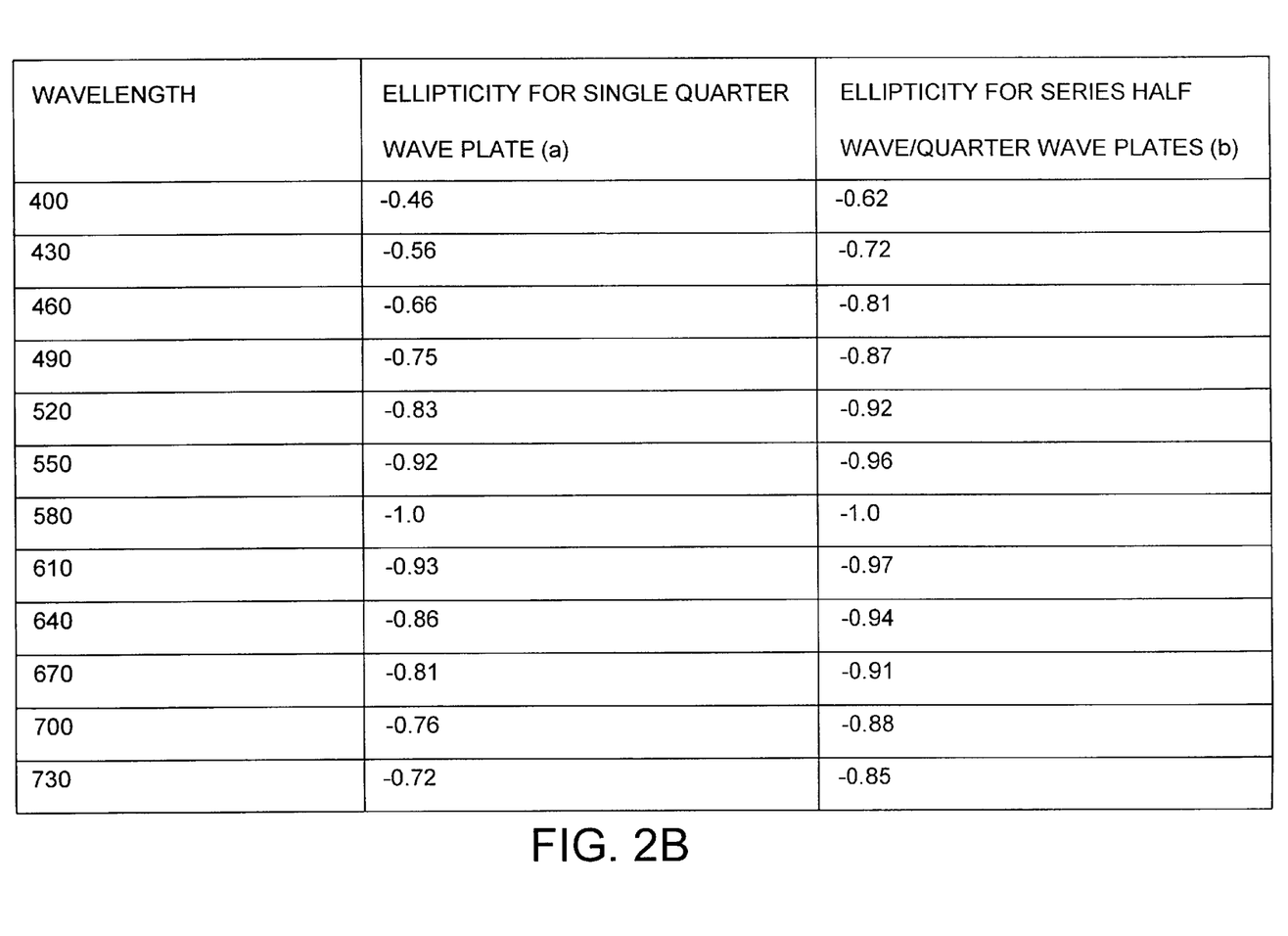
FIG. 2B is a table showing the ellipticity of light outputted by such a device as a function of wavelength.

This is demonstrated by the table of FIG. 2B which shows the calculated ellipticity of the output light for the two cases of (a) convention patterned single layer retarder designed to act as a quarter wave plate for incident light at a wavelength of 580 nm, and (b) the combination of a patterned half wave plate retarder 1 and a non-patterned quarter wave plate retarder 10 as shown in FIG. 2A, the two layers 2 and 11 of such a combination again being designed for incident light having a wavelength of 580 nm. This table clearly demonstrates the more achromatic circular polarisation by use of the combination of FIG. 2A as the wavelength is varied above and below the design wavelength of 580 nm. The table does not allow for wavelength dispersion of the refractive indices.

Figure 3:
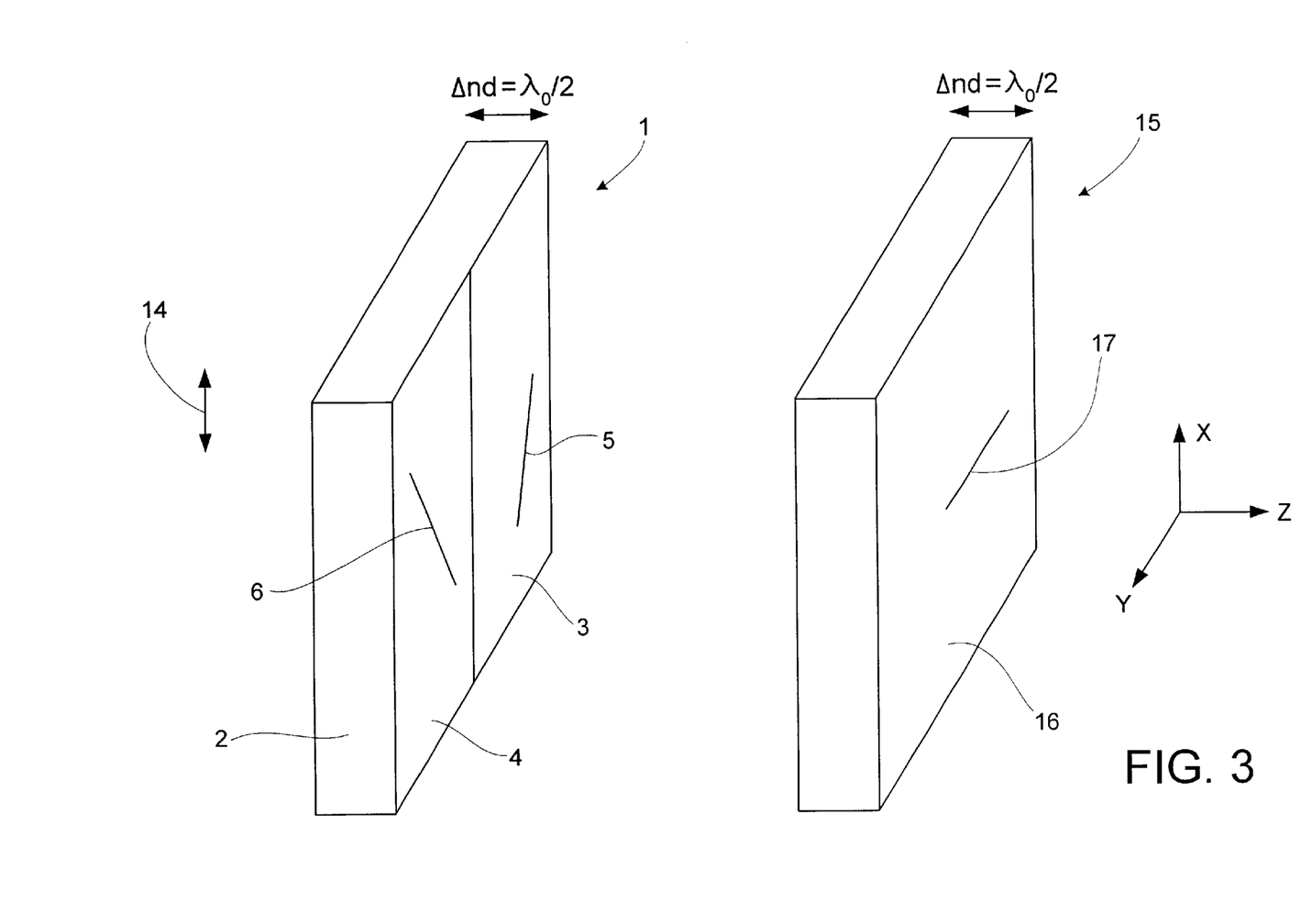
FIG. 3 is a schematic diagram of a further broadband optical retardation device in accordance with the invention consisting of a combination of a patterned uniform half wave plate and a non-patterned uniform half wave plate.

FIG. 3 shows an alternative embodiment in which a patterned uniform half wave plate retarder 1 is used in combination with a non-patterned uniform half wave plate retarder 15 consisting of a non-patterned layer 16 having a retardance $\Delta nd-\lambda_0/2$ and an optic axis 17 at 90° to the xz plane. As in the previously described embodiment the optic axes 5 and 6 of the layer 2 are respectively at +22.5° and −22.5° to the xz plane. Light 14 of wavelength $\lambda_0$ linearly polarised along the xy plane and incident on the layer 2 in the z direction produces light at the output side of the device consisting of two components linearly polarised at +45° and −45° to the xz plane. In this case the output light becomes progressively less linearly polarised as the wavelength of the incident light is varied either side of $\lambda_0$, but not to the same extent as would be the case in use of a conventional patterned single layer half wave plate retarder. Thus, whilst the embodiment of FIG. 3 is designed to produce linearly polarised light components, whereas the embodiment of FIG. 2A is designed to produce circularly polarised light components, the embodiment of FIG. 3 provides similar broad band behaviour to the embodiment of FIG. 2A.

Figure 4A:
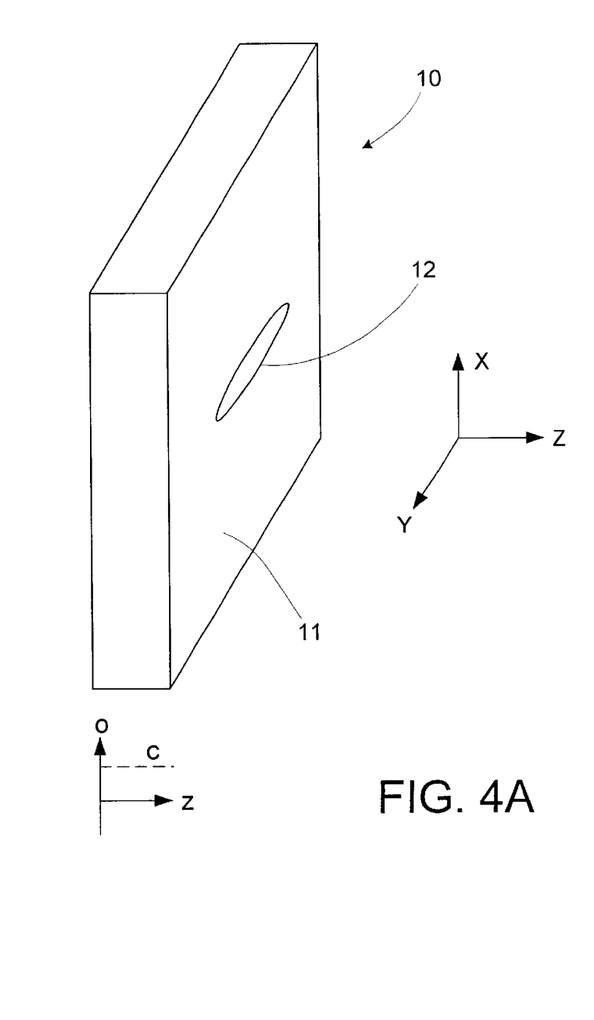
FIG. 4A is a schematic diagram of a further broadband optical retardation device in accordance with the invention consisting of a combination of a patterned twisted half wave plate and a non-patterned uniform half wave plate.

In both the embodiments described above with reference to FIGS. 2A and 3, the patterned and non-patterned layers are both uniform, that is the orientation of the optic axes of the patterned and non-patterned layers do not vary through the thickness of the layers. However, as already mentioned, it is also possible to make use of patterned and/or non-patterned twisted layers, that is layers in which the orientation of the optic axis varies through the thickness of the layer. FIG. 4A shows an embodiment of the invention in which a patterned twisted half wave plate retarder 20 is used in combination with a non-patterned uniform quarter wave plate retarder 10 (similar to that described with reference to FIG. 2A). The patterned twisted retarder 20 consists of a layer 21 including first and second regions 22 and 23 having optic axes having orientations which vary through the thickness of the layer 21. In the particular example given the orientations of the optic axes vary from being parallel to the xz plane at the input side of the layer, as shown at 26 and 27, to being at orientations of +37° and −37° respectively relative to the xz plane at the output side of the layer 21, as shown at 28 and 29. There is also shown in FIG. 4A graphs of the orientations O of the optic axes of the retarders 10 and 20 against position in the z direction through the thickness of the retarder, a and b being the orientations of the optic axes of the regions 22 and 23 of the retarder 20 and c being the orientation of the optic axis 12 of the retarder 10.

Figure 4B:
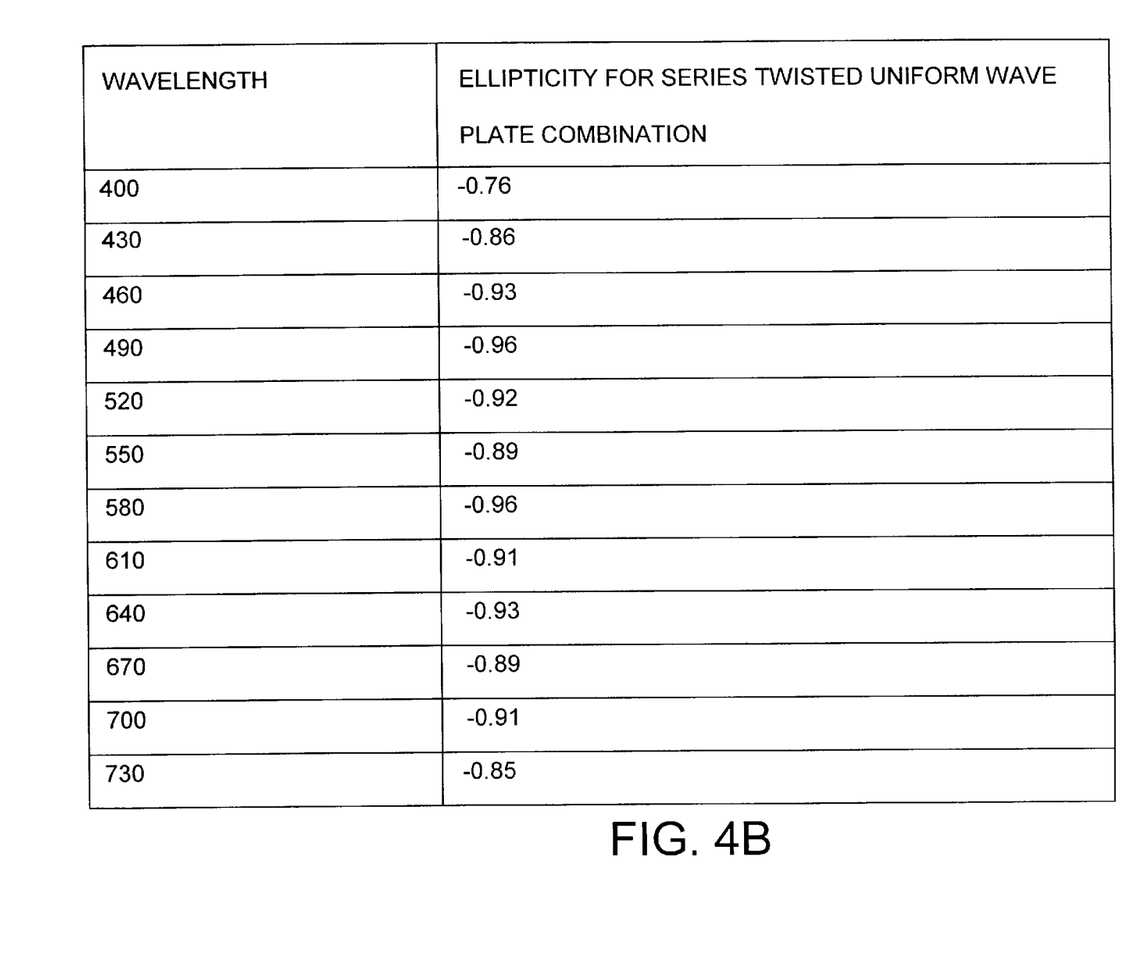
FIG. 4B is a table showing the ellipticity of light outputted by such a device as a function of wavelength.

FIG. 4B is a table showing the ellipticity of the output light of such a combination as a function of the wavelength of the incident light, under similar conditions to those used for the table of FIG. 2B. This shows a further improvement in the achromatic circularly polarisation as compared with the conventional single quarter wave plate retarder for which corresponding ellipticity values are shown in FIG. 2B.

Figure 5:
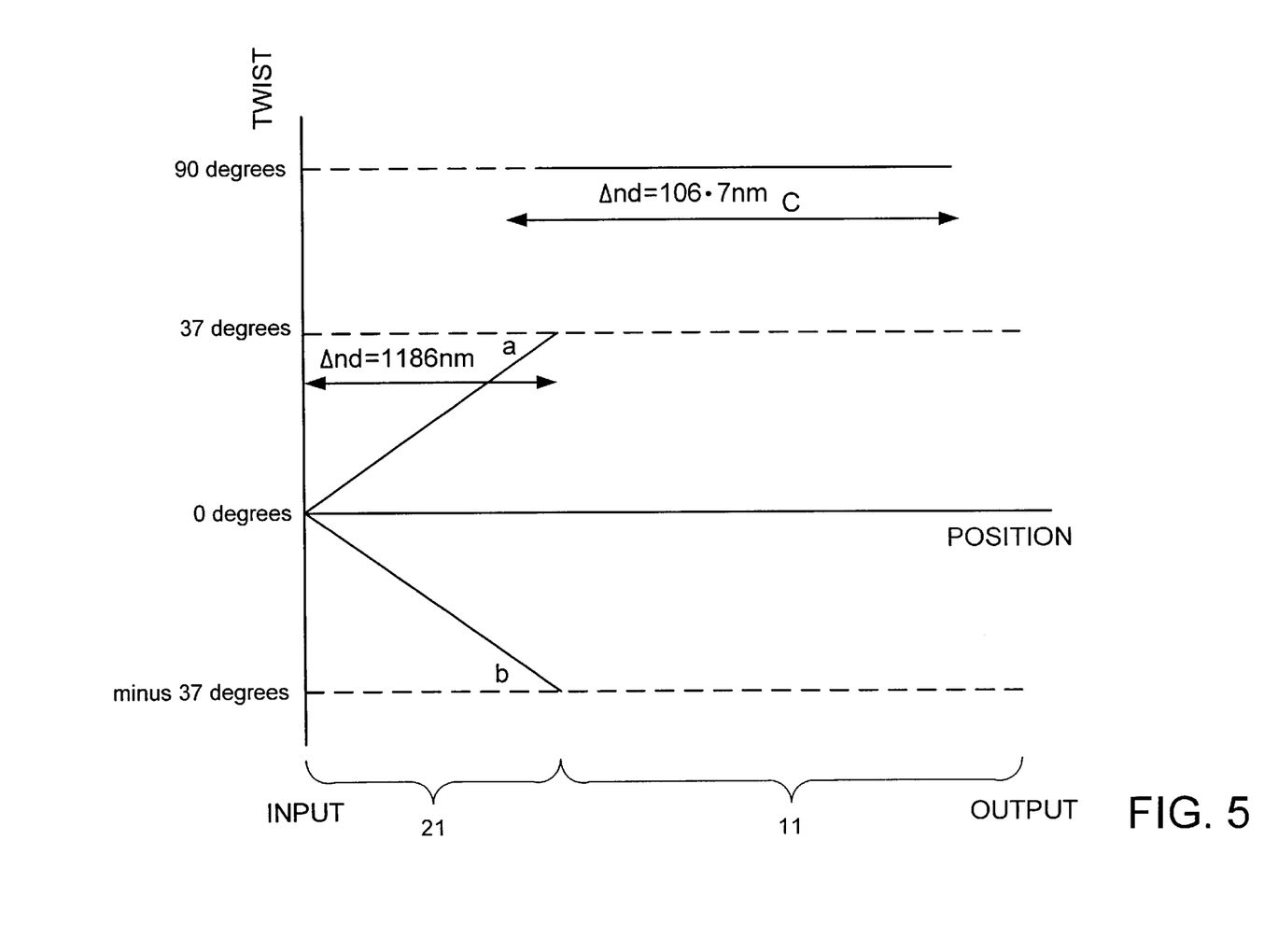
FIG. 5 is a graph showing variation of the orientation of the optic axis over the two wave plates of the device of FIG. 4.

FIG. 5 is a further graph showing the variation in the orientations a and b of the regions 22 and 23 of the layer 21, as shown in FIG. 4A, as a function of position along the z direction, as well as the constant orientation c of the optic axis 12 of the layer 11. It will be appreciated from this graph that the orientation a of the optic axis of the first region 22 varies linearly with position from 0° to +37° from the input side to the output side of the layer 21, whereas the orientation b of the optic axis of the second region 23 varies linearly with position from 0° to −37° from the input side to the output side of the layer 21, giving in both cases an optical retardation of 1186.1 nm. Furthermore the optical retardation of the layer 11 having its optic axis 12 at a uniform orientation c of 90° across the layer provides an optical retardation of 106.7 nm. Clearly incident light having a polarisation axis at 0° will be converted to right or left handed circular polarised light depending on whether it is transmitted through the region 22 or the region 23 of the layer 21.

Figure 6A:
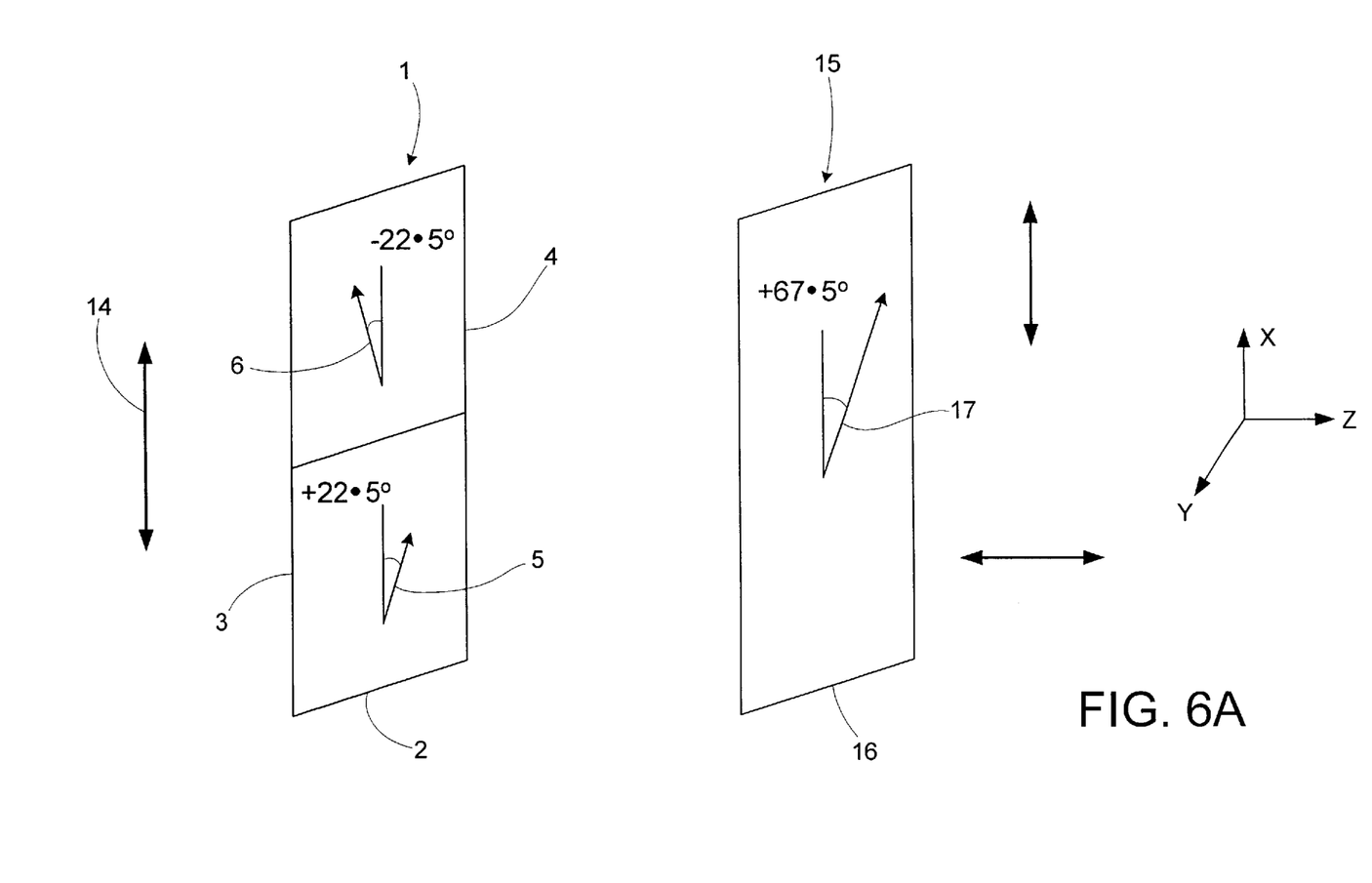
FIG. 6A is a schematic diagram of a further broadband optical retardation device in accordance with the invention.
Figure 6B:
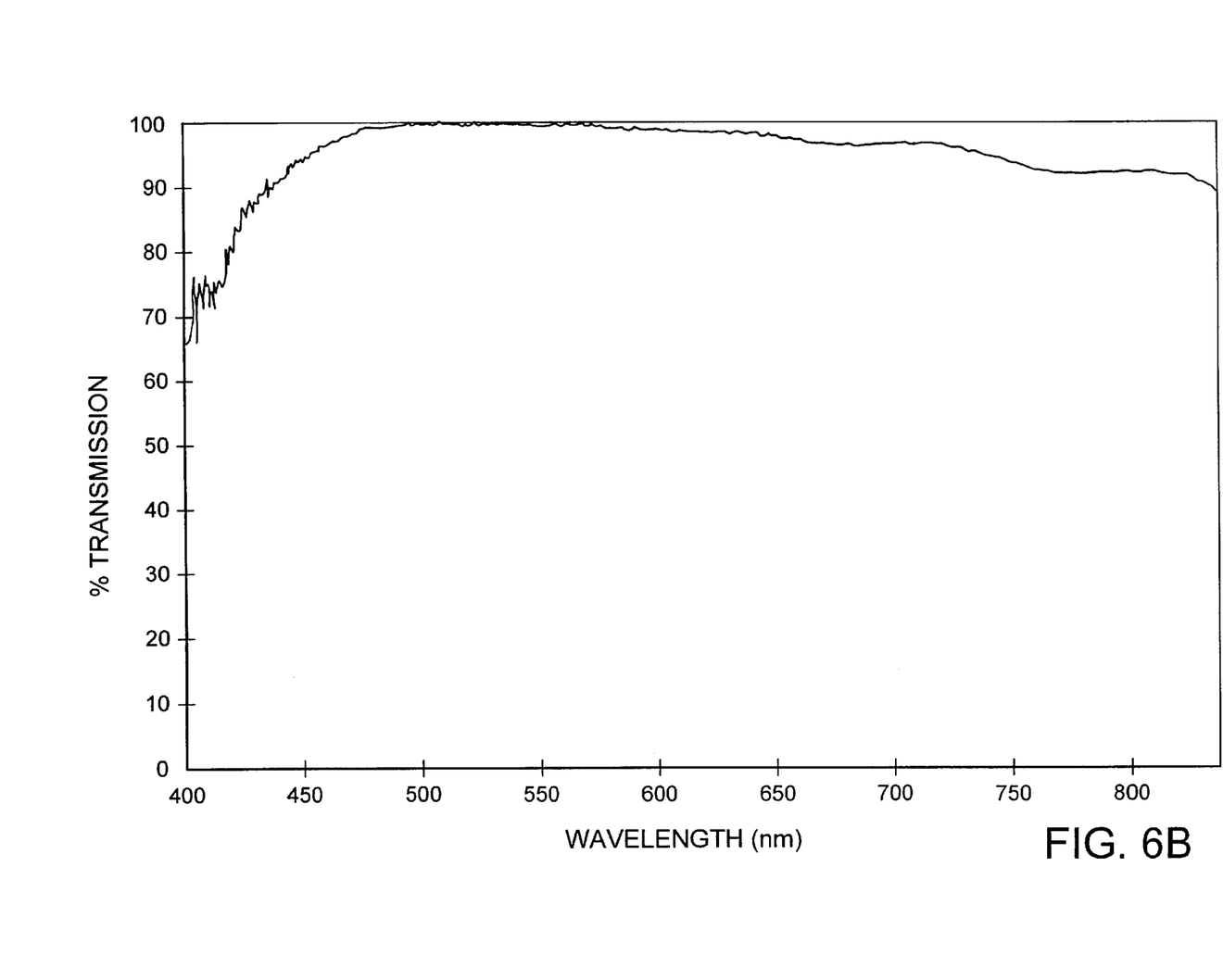
FIG. 6B is a graph of the transmission level against wavelength of light received in use of an embodiment of the invention.

FIG. 6A diagrammatically shows a further embodiment of the invention in which a patterned uniform half wave plate retarder 1 is used in combination with a non-patterned uniform half wave plate retarder 15, as in the embodiment of FIG. 3, except that in this case light 14 linearly polarised along the xy plane and incident on the layer 2 in the z direction produces light at the output side of the device consisting of two components linearly polarised at 0° and 90° to the xz plane. This is achieved by the optic axes 5 and 6 of the layer 2 having orientations a and b and the optic axis 17 of the layer 16 having an orientation c where these orientations satisfy the relationships c=a+45° and b=c−90°, where a=+22.5°, b=−22.5° and c=+67.5°. Light transmitted through the region 4 of the layer 2 and then through the layer 16 remains linearly polarised at 0° for all wavelengths, whilst light passing through the region 3 of the layer 2 and then through the layer 16 becomes linearly polarised at 90° at the wavelength for which the device is designed and close to this orientation for other wavelengths. Such an embodiment, for use as a parallax barrier for instance, is disclosed in British Patent Application No. 9804500.8.

Although not specifically described with reference to the drawings, it will be appreciated that it is also possible to provide an embodiment of the invention in which a patterned uniform retarder is combined with a non-patterned twisted retarder. Furthermore other embodiments may be provided in accordance with the invention in which the optic axes of the two regions of the patterned retarder are not symmetrically orientated with respect to the reference axis and/or in which more than two regions of different optic axis orientation are provided. Where only two such regions of different orientation are provided, it is generally a requirement that the average optic axis (or alternatively the output director) of the non-patterned retarder is orientated along a direction within the outer angle between the average optic axes (or alternatively the output directors) of the two regions of the patterned retarder. In a possible further embodiment the patterned and/or non-patterned retarder may be constituted by a switchable liquid crystal device.

EXAMPLE 1

A possible method of fabrication which might be used to produce the embodiment of FIG. 2A will now be described, by way of example. In this method the layers 2 and 11 are fabricated using reactive mesogen (RM) materials, as these materials have a high birefringence (Δn–0.15) in relatively thin retardance layers, as well as being capable of being polymerised, for example by exposure to ultraviolet light. The particular fabrication method may use a solution of diacrylate RM 257 (supplied by Merck Limited, Poole, UK) for producing retarders designed to act as half wave and quarter wave plates at 500 nm.

Figure 7A:
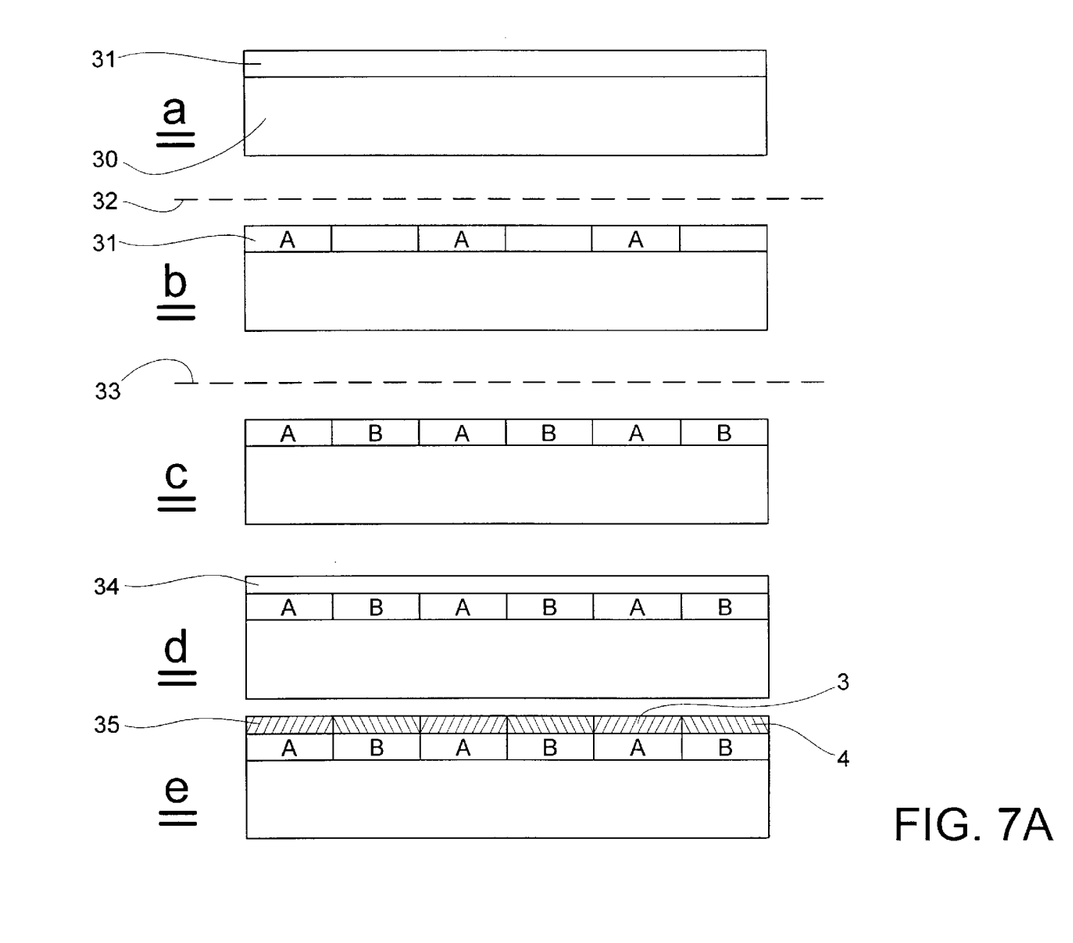
FIG. 7A schematically shows successive operational steps a to e in a possible fabrication method.

An alignment layer 31 is first formed on a substrate by spin coating of a linearly photopolymerisable material such as is described, for example, in "Surface induced parallel alignment of liquid crystals by linearly polymerised photopolymers", Schadt et al., Japanese Journal of Applied Physics, vol. 31 (1992), page 2155, as shown at a in FIG. 7A. The alignment layer 31 is then exposed to radiation of a first linear polarisation through a mask 32 so as to photopolymerise the layer 31 in one alignment direction to form the regions A, as shown at b in FIG. 7A. The unexposed regions of the layer 31 are then exposed to radiation having a different linear polarisation through a mask 33 so as to photopolymerise the layer 31 in a different alignment direction to form the regions B, as shown at c in FIG. 7A. Thus alternate regions A and B of the alignment layer 31 provide different alignment directions, for example differing by 45°, which may be used to align different regions of a subsequently applied RM layer. The alignment layer 31 is then covered by a retarder layer 34 by spin coating of RM 257 solution, as shown at d in FIG. 7A, and the retarder layer 34 is fixed or polymerised by exposure to ultraviolet radiation so as to form a patterned uniform retarder 35, as shown at a in FIG. 7A, having regions which take up the alignment of the regions A and B and which correspond to the regions 3 and 4 of the patterned layer 2 of FIG. 2A. The non-patterned uniform retarder 15 may then be formed by spin coating of a further layer (not shown in FIG. 7A) of RM 257 solution which is fixed or polymerised by exposure to ultraviolet radiation.

EXAMPLE 2

An alternative method of fabrication which might be used to produce the embodiment of FIG. 2A will now be described. This method will be described only to the extent to which it differs from the method already described with reference to FIG. 7A.

In the alternative method the alignment layer 31 is first unidirectionally rubbed throughout its free surface. For instance, the layer 31 may be rubbed three times with a rubbing cloth on a roller rotating at 3000 rpm. After such rubbing, masking of the alignment layer 31 is performed using standard photolithographic techniques, that is by spin-coating a layer of positive photoresist on top of the layer 31, soft-baking the photoresist, exposing the photoresist to ultraviolet light through a mask and developing the photoresist to remove the photoresist from the regions of the layer 31 which are to form the regions B.

The photoresist layer is then hard-baked prior to a subsequent rubbing step being performed with the second rubbing direction being at a predetermined angle, for example at 45°, to the first rubbing direction. In practice the second rubbing direction may be slightly offset so as to compensate for the residual effect of the first rubbing. Finally the photoresist is removed to leave the finished substrate and alignment layer to which the retarder layer 34, as shown at d in FIG. 7A, is applied by spin-coating prior to being fixed or polymerised by exposure to ultraviolet radiation so as to form the patterned uniform retarder 35 as shown at e in FIG. 7A.

Such a method of fabrication is disclosed in more detail in British Patent Application No. 9804501.6.

The substrate 30 is selected so as to minimise any birefringence which would otherwise affect the performance of the device, for example by reducing contrast ratio or degrading the chromatic performance of the device. The substrate may, for example, be a suitable float glass of appropriate flatness. Furthermore the wavelength characteristic of the retarder can be designed by using the Poincare sphere technique as described, for example, in the S. Pancharatnam references mentioned above, or by use of the well known Jones matrix technique.

The embodiment of FIG. 3 may be produced in a broadly similar manner except that the layer 16 is formed as a uniform half wave plate. FIG. 6A is a graph showing the transmission of the output light in use of the embodiment of FIG. 3 as a function of the wavelength of the incident light. In order to produce this graph the linearly polarised incident light 14 was directed onto the device described with the reference to FIG. 3, and an analyser was orientated at 45° to the xz plane and the transmission of light through the regions 4 measured. The broad band achromatic response was seen by rotating the analyser to −45°. A similar response can be obtained for transmission through the regions 3.

Figure 7B:
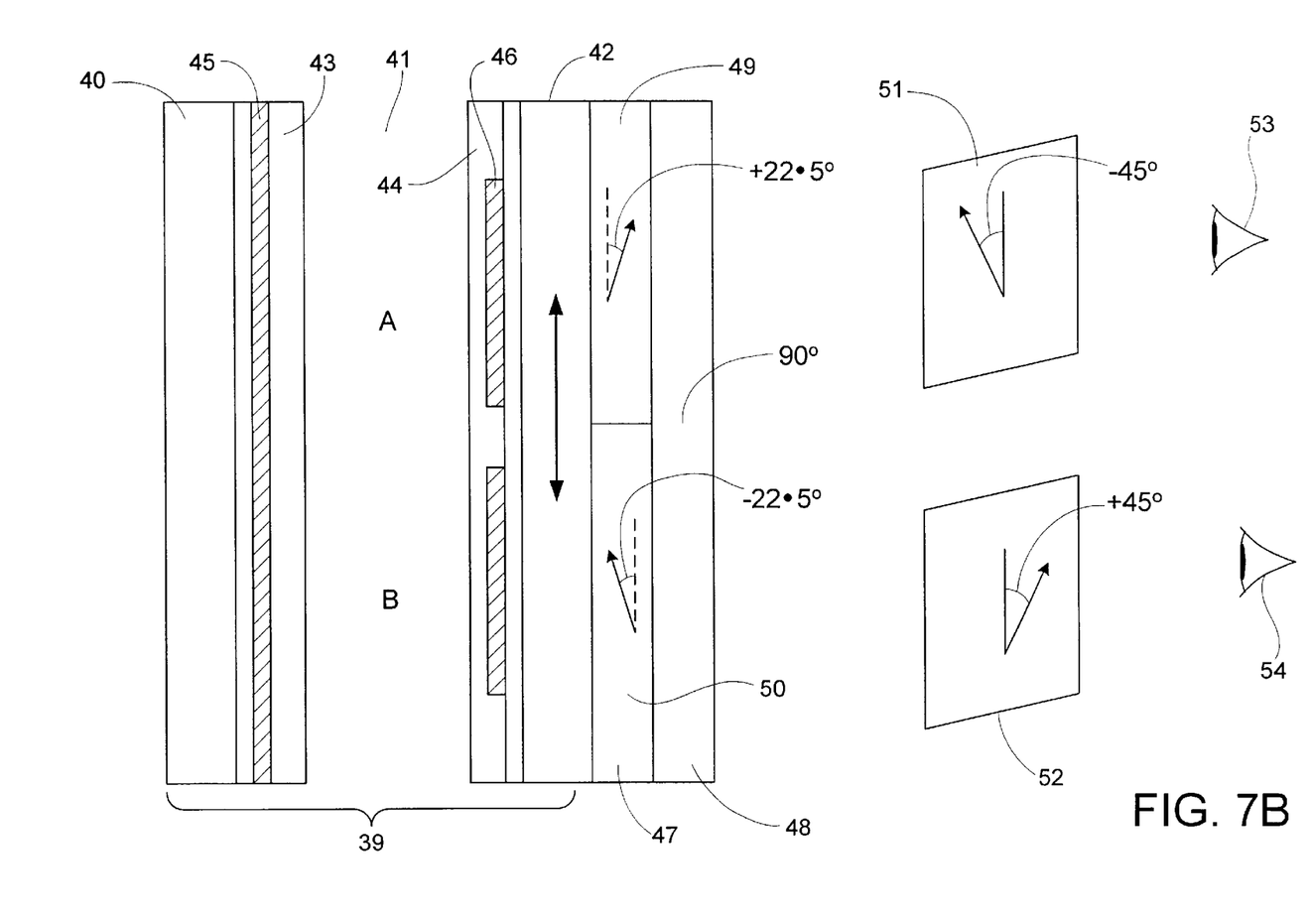
FIG. 7B schematically shows a liquid crystal display (LCD) incorporating a broadband optical retardation device in accordance with the invention.

FIG. 7B diagrammatically shows a liquid crystal display (LCD) formed by a display panel 39 including a polariser 40 and an analyser 42 disposed on opposite sides of a liquid crystal layer 41 with alignment layers 43, 44 and electrodes 45, 46 being provided on opposite sides of the liquid crystal layer 41 in known manner. The liquid crystal layer 41 includes pixels A and B at the crossing points of the electrodes 45, 46 which may be addressed by data and scan signals applied to the electrodes 45, 46 in known manner. Furthermore a patterned uniform retarder 47 and a non-patterned uniform retarder 48 are applied to the analyser 42. The patterned retarder 47 consists of a patterned half wave plate having regions 49 aligned with the pixels A and regions 50 aligned with the pixels B. The regions 49 and 50 have their optic axes arranged at +22.5° and −22.5° to the output polarisation state of the LCD panel 39, and the non-patterned retarder 48 is constituted by a uniform half wave plate having its optic axis at 90° to the output polarisation state of the LCD panel 39.

Such a LCD may be viewed by the two eyes 53 and 54 of a viewer through spectacles having polarisers 51 and 52 with transmission axes arranged at −45° and +45° respectively to the output polarisation state of the LCD panel 39 in order to observe a stereoscopic image made up of image components transmitted by the pixels A and B respectively. Alternatively one set of viewers may observe the LCD through polarisers with transmission axes at −45°, whilst another set of viewers observes the LCD through polarisers with transmission axes at +45°. As a result the two sets of viewers receive different information from the LCD, allowing two channels of information, such as two television channels or a computer game and a television channel or two documents, to be concurrently viewed using a single LCD panel.

Figure 8:
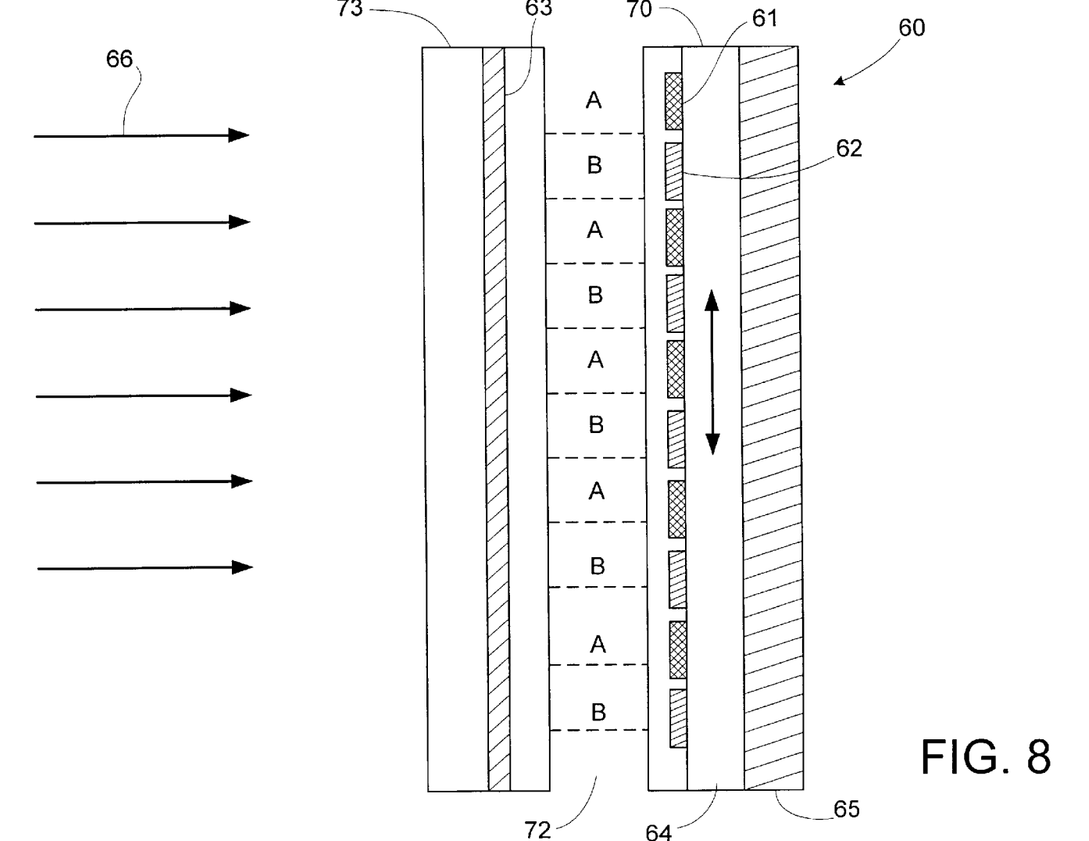
FIG. 8 schematically shows a diffractive optical system incorporating a broadband optical retardation device in accordance with the invention.

FIG. 8 diagrammatically shows a diffractive optical system 60 including two sets of interleaved electrodes 61, 62 provided on a substrate 70 and disposed on the opposite side of a surface stabilised ferroelectric liquid crystal (SSFLC) layer 71 to an electrode 63 provided on a substrate 73. The sets of electrodes 61 and 62 are at different potentials to one another, for example at $+V_0$ and $-V_0$, and to the electrode 63 which is at 0 volts, for example. The SSFLC layer 72 is arranged such that, under these conditions, the optic axes of the regions A and B adjacent to the electrode sets 61 and 62 are respectively at +22.5 and −22.5% to an arbitrary reference axis. Also provided on the substrate 70 are a quarter wave retarder 64 having its optic axis at 90 degrees to the arbitrary axis and a mirror 65. Under these conditions unpolarised light 66 incident on the system 60 is diffracted by the regions A and B and the quarter wave retarder 64 into reflected non-zero orders. The diffraction has good achromaticity compared with the case in which a quarter wave retarder is provided which is orientated at 0 degrees to the arbitrary reference axis. If the electrode sets 61 and 62 are then both set to the same potential $+V_0$ with respect to the electrode 63 at 0 volts, the optic axes of the regions A and B of the SSFLC layer 72 become parallel, and no diffraction of the unpolarised light 66 into reflected non-zero orders occurs. Thus, by switching of the electrodes 62, the patterning of the layer 72 can be turned on and off to provide an enhanced switchable achromatic diffractive optical system.

INDUSTRIAL APPLICABILITY

As described above, the invention makes possible the advantage of providing an optical retardation device having improved achromaticity which enables generation of broad band orthogonal optical modes and which permits a broad bandwidth response to be obtained with improvement in the quality and/or ease of fabrication as compared with known broadband optical retardation devices. The broadband optical retardation devices may be used for polarisation encoding of display information or in diffractive optical systems, for example.

What is claimed is:

1. A broadband optical retardation device for receiving light consisting of a broad range of wavelengths, the device including patterned optical retardation means including a first region having a first optic axis at an orientation a between 0° and +90° to a reference plane and a second region in a same plane as the first region and having a second optic axis at an orientation b between 0° and −90° to the reference plane, and non-patterned optical retardation means having an optic axis at a defined orientation c, greater than the orientation a and less than the orientation 180°+b, to the reference plane in order to increase the achromaticity of the light polarised by the combination of the patterned optical retardation means and the non-patterned optical retardation means as compared with light polarised by the patterned optical retardation means alone, and wherein the orientations a and b of the first and second optic axes of the patterned optical retardation means are substantially equal and opposite relative to the reference plane, and the orientation c of the optic axis of the non-patterned retardation means is substantially perpendicular to the reference plane.

2. A device according to claim 1, wherein the first and second regions of the patterned optical retardation means are such as to polarise input light linearly polarised along the reference plane such that, after passing through the non-patterned optical retardation means, the polarisation of the light which has passed through the first region is orthogonal to the polarisation of the light which has passed through the second region.

3. A device according to claim 1, wherein of the orientations a and b of the first and second optic axes of the patterned optical retardation means are in the ranges of +10° to +75° and −10° to −75° respectively relative to the reference plane.

4. A device according to claim 3, wherein the orientations a and b of the first and second optic axes of the patterned optical retardation means are in the ranges of +10° to +35° and −10° to −35° respectively relative to the reference plane.

5. A device according to claim 4, wherein the orientations a and b of the first and second optic axes of the patterned optical retardation means are about +22.5° and −22.5° respectively relative to the reference plane.

6. A device according to claim 1, wherein the orientations a and b of the first and second optic axes of the patterned optical retardation means and the orientation c of the optic axis of the non-patterned optical retardation means substantially satisfy the relationship c=a+45° and b=c−90°.

7. A device according to claim 6, wherein the orientations a and b are about +22.5° and −22.5° respectively and the orientation c is about +67.5° relative to the reference plane.

8. A device according to claim 1, wherein the patterned optical retardation means comprises patterned uniform layer having an optic axis which varies between the first and second regions along one or more directions x and y parallel to the layer, but which does not vary substantially through the thickness of the layer.

9. A device according to claim 1, wherein the patterned optical retardation means comprises patterned twisted retardation layer having an optic axis which varies between the first and second regions along one or more directions x and y parallel to the layer and also through the thickness of the layer.

10. A device according to claim 1, wherein the non-patterned optical retardation means comprises a uniform retardation layer whose optic axis has an orientation which does not vary substantially through the thickness of the layer.

11. A device according to claim 1, wherein the non-patterned optical retardation means comprises a twisted retardation layer whose optic axis has an orientation which varies through the thickness of the layer.

12. A device according to claim 1, wherein the patterned optical retardation means is a half wave plate.

13. A device according to claim 1, wherein the non-patterned optical retardation means is a half wave plate.

14. A device according to claim 1, wherein the non-patterned optical retardation means is a quarter wave plate.

15. A device according to claim 1, wherein the patterned optical retardation means incorporates third regions having a third optic axis at an orientation between a and b.

16. A device according to claim 15, wherein the orientations a and b of the first and second optic axis of the patterned optical retardation means are about +22.5° and −22.5° to the reference plane, the orientation of the third optic axis is at about 0° to the reference plane, and the orientation c of the optic axis of the non-patterned optical retardation means is about 90° to the reference plane.

17. A device according to claim 1, wherein the patterned optical retardation means comprises a suitable liquid crystal device.

18. A device according to claim 1, wherein the non-patterned optical retardation means comprises a suitable liquid crystal device.

19. An optical display system incorporating an optical retardation device according to claim 1.

20. A diffractive optical system incorporating an optical retardation device according to claim 1.

21. A device according to claim 1, wherein the non-patterned optical retardation means is provided in optical series with the patterned optical retardation means.

22. An optical retardation device comprising patterned optical retardation means comprising a first region having a first optic axis configuration and a second region in a same plane as the first region and having a second optic axis configuration, and non-patterned optical retardation means having a further optic axis configuration, at least one of the optic axis configurations being a twisted optic axis configuration whose optic axis has an orientation which varies through the thickness of a layer, whereby the achromaticity of the light polarised by the combination of the patterned optical retardation means and the non-patterned optical retardation means is increased as compared with light polarised by the patterned optical retardation means alone, and wherein the orientations a and b of the first and second optic axes of the patterned optical retardation means are substantially equal and opposite relative to the reference plane, and the orientation c of the optic axis of the non-patterned retardation means is substantially perpendicular to the reference plane.

23. A device according to claim 22, wherein the first optic axis configuration has an average optic axis orientation a between 0° and +90° to a reference plane, the second optic axis configuration has an average optic axis orientation b between 0° and −90° to the reference plane, and the further optic axis configuration has an average optic axis orientation c, greater than the orientation a and less than the orientation 180°+b, to the reference plane.

24. A device according to claim 22, wherein the first optic axis configuration has an output director orientation a between 0° and +90° to a reference plane, the second optic axis configuration has an output director orientation b between 0° and −90° to the reference plane, and the further optic axis configuration has an output director orientation c, greater than the orientation a and less than the orientation 180°+b, to the reference plane.

25. A device according to claim 22, wherein the first and second regions of the patterned optical retardation means are such as to polarise input light linearly polarised along a reference plane such that, after passing through the non-patterned optical retardation means, the polarisation of the light which has passed through the first region is orthogonal to the polarisation of the light which as passed through the second region.

26. A device according to claim 22, wherein the further optic axis configuration is uniform having an optic axis orientation which does not vary substantially through the thickness of a layer.

27. A device according to claim 22, wherein the first and second optic axis configurations are uniform having optic axis orientations which do not vary substantially through the thickness of a layer.

28. A device according to claim 22, wherein the non-patterned optical retardation means is provided in optical series with the patterned optical retardation means.

* * * * *